US011214218B2

(12) United States Patent
Strobel et al.

(10) Patent No.: US 11,214,218 B2
(45) Date of Patent: Jan. 4, 2022

(54) METHOD FOR ASSEMBLING AN ACTUATOR ASSEMBLY AND AIR BAG MODULE COMPRISING AN ASSEMBLED ACTUATOR ASSEMBLY

(71) Applicant: TRW AUTOMOTIVE GMBH, Alfdorf (DE)

(72) Inventors: Bernd Strobel, Mutlangen (DE); Jens Debler, Iggingen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 601 days.

(21) Appl. No.: 16/073,374

(22) PCT Filed: Jan. 24, 2017

(86) PCT No.: PCT/EP2017/051367
§ 371 (c)(1),
(2) Date: Jul. 27, 2018

(87) PCT Pub. No.: WO2017/133920
PCT Pub. Date: Aug. 10, 2017

(65) Prior Publication Data

US 2021/0086716 A1 Mar. 25, 2021

(30) Foreign Application Priority Data

Feb. 3, 2016 (DE) ..................... 10 2016 001 142.4

(51) Int. Cl.
*B60R 21/217* (2011.01)
*B60R 21/017* (2006.01)
(Continued)

(52) U.S. Cl.
CPC .......... *B60R 21/217* (2013.01); *B60R 21/017* (2013.01); *B60R 21/2338* (2013.01);
(Continued)

(58) Field of Classification Search
CPC . B60R 21/217; B60R 21/017; B60R 21/2338; B60R 21/239;
(Continued)

(56) References Cited

U.S. PATENT DOCUMENTS 8,377,833 B2 2/2013 Schulthess
2010/0090445 A1* 4/2010 Williams ............ B60R 21/2338 280/728.2

(Continued)

*Primary Examiner* — Keith J Frisby
(74) *Attorney, Agent, or Firm* — Tarolli, Sundheim, Covell & Tummino LLP

(57) ABSTRACT

The invention relates to an airbag module (16) of a vehicle safety system as well as to a method of mounting an actuator assembly (10) for activating a tensile means (12) on a module casing (14) of the airbag module (16), comprising the following steps:

a) the tensile means (12) is connected to the actuator assembly (10) and is fixed to a mounting element (18) together with the actuator assembly (10) so that the tensile means (12), the actuator assembly (10) and the mounting element (18) constitute a pre-mounted unit (20);

the pre-mounted unit (20) is arranged inside the module casing (14) and is fastened to the module casing (14) by means of the mounting element (18).

11 Claims, 3 Drawing Sheets

(51) Int. Cl.
*B60R 21/2338* (2011.01)
*B60R 21/264* (2006.01)

(52) U.S. Cl.
CPC .. *B60R 21/264* (2013.01); *B60R 2021/23384* (2013.01); *B60R 2021/23388* (2013.01)

(58) Field of Classification Search
CPC B60R 2021/23384; B60R 2021/23388; B60R 2021/23382; B60R 2021/23386; B60R 2021/2395
USPC .................................. 280/728.2, 743.2, 739
See application file for complete search history.

(56) References Cited

U.S. PATENT DOCUMENTS

2010/0187797 A1 * 7/2010 Debler ................ B60R 21/2338 280/737
2013/0049336 A1 * 2/2013 Fukawatase ........ B60R 21/2338 280/741

* cited by examiner 12
34
38
20
24
18
10,28
38
34

36
34
16
14
20
10,28
34
44
48
36

36
34
38
16
14
20
42
44
34
36

38
36
12
16
20
18
14
36

16
34
38
40
38

10,28
14
34
44
46

METHOD FOR ASSEMBLING AN ACTUATOR ASSEMBLY AND AIR BAG MODULE COMPRISING AN ASSEMBLED ACTUATOR ASSEMBLY

RELATED APPLICATIONS

This application corresponds to PCT/EP2017/051367, filed Jan. 24, 2017, which claims the benefit of German Application No. 10 2016 001 142.4, filed Feb. 3, 2016, the subject matter of which are incorporated herein by reference in their entirety.

BACKGROUND OF THE INVENTION

The invention relates to an airbag module of a vehicle safety system comprising a module casing and an actuator assembly mounted on the module casing as well as to a method of mounting an actuator assembly for activating a tensile means on a module casing of an airbag module.

In engineering, for example also in vehicle safety engineering, explosive bolts are used as actuator assemblies. Usually they are extremely robust metal components which are fastened via a thread and are capable of absorbing very high forces. The required activating energy of said explosive bolts is correspondingly high so that they will expose casing apertures, displace component parts (sometimes against compressive force) or sever themselves, for example.

In modern vehicle safety systems, especially in airbag modules, efforts are made to adapt the safety system more and more individually to different parameters of a crash situation. It is one known and advantageous option in this respect to make use of tensile means such as tethers by activation of which discharge orifices will be opened or closed. Said tensile means can also be used to alternatively or additionally influence the airbag geometry and/or to release an additional airbag volume.

For actively activating a tether a so-called tether activation unit “TAU” is required. Said TAUs usually are subjected to shear stress by comparatively low transverse force loads. Conventional explosive bolts are frequently overdimensioned and too expensive for such applications.

Therefore, in prior art already actuator assemblies which have a plastic casing and can be manufactured at low cost have been suggested for active tether activation.

It is further known in airbag modules comprising such actuator assemblies to provide a restraint means which restricts the free mobility of a fragment separated after actuation of the actuator assembly. In this way, undesired contact with a vehicle occupant or damage of the airbag module by separated fragments is largely excluded.

DE 10 2008 028 921 A1, for example, illustrates an airbag module comprising an actuator assembly for activating a tether, wherein the actuator assembly is mounted inside a stable generator casing of the airbag module and upon actuation thereof ruptures into a fixed fastening portion and at least one separated fragment. In order to restrict the free mobility of the separated fragment a restraint means, especially a receiving cage for the separated fragment formed by the generator casing is provided.

However, it has turned out that fastening of the tensile means to the actuator assembly in the form of TAU as well as especially mounting of the TAU on the airbag module requires complicated constructional changes (for example on the gas generator) and/or is very time-consuming for an assembler and thus expensive.

SUMMARY OF THE INVENTION

It is therefore the object of the invention to provide an airbag module comprising an actuator assembly for activating a tensile means which is inexpensive, compact and easy to manufacture and which meets all existing safety requirements to pyrotechnical actuators as regards movable components or fragments and moreover can be easily mounted on the airbag module of a vehicle safety system.

In accordance with the invention, the object is achieved by a method of mounting an actuator assembly for activating a tensile means on a module casing of an airbag module, comprising the following steps:

a) the tensile means is connected to the actuator assembly and is fixed on a mounting element along with the actuator assembly so that the tensile means, the actuator assembly and the mounting element constitute a pre-mounted unit;

b) the pre-mounted unit is arranged inside the module casing and is fastened to the module casing by means of the mounting element.

In said mounting method, the module casing of the airbag module is not required for fixing the tensile means to the actuator assembly so that pre-mounting is quickly and easily possible in the method step a). Since, incidentally, the pre-mounted unit is arranged and fastened not outside (as usual) but inside the module casing, the tensile means need not be threaded through slits or apertures in the module casing for being fixed to the actuator assembly. This too, contributes to an especially quick and easy mounting of the actuator assembly on the module casing of the airbag module.

According to one method variant, the tensile means is fastened to an airbag of the airbag module already prior to step a). In this way, the tensile means frequently provided in the form of a tether can be fastened to the airbag, especially stitched or glued to the airbag wall, with little effort already during manufacture of the airbag.

Preferably, the tensile means forms a loop into which the actuator assembly is inserted in step a) so as to connect the tensile means to the actuator assembly. The actuator assembly, especially a bursting portion of the actuator assembly, for this purpose includes e.g. a groove-shaped predetermined breaking point in which the tensile means engages.

According to another method variant, in step a) the tensile means is initially guided through an opening in the mounting element and is subsequently connected to the actuator assembly. The tensile means is especially a tether, a string, a cord or the like.

In step a) the actuator assembly preferably is locked with the mounting element so as to form the pre-mounted unit. By locking the tensile means can be fixed very quickly to the actuator assembly while forming a pre-mounted unit, wherein the correct position of the tensile means can be easily checked and at a later stage of the mounting method need no longer be inspected with great effort.

Especially preferred, the pre-mounted unit is locked in step b) with the module casing. Said locking connection enables the pre-mounted unit to be mounted extremely quickly and moreover ensures especially reliable fastening to the module casing. Since the module casing as well as the pre-mounted unit, especially the mounting element of the pre-mounted unit, are usually made from synthetic material, the configuration of appropriate locking elements is moreover possible in a simple and inexpensive manner with little manufacturing expenditure.

According to a further method variant, the mounting element includes a mounting flange and the module casing includes guide elements for the mounting flange, the mounting flange in step b) being inserted into the guide elements until the pre-mounted unit reaches the final mounting position. Said final mounting position is defined, for example, by a stop formed at the guide elements or at the module casing. Such sliding seat helps to anchor the pre-mounted unit especially reliably and permanently to the module casing and only forces acting against the inserting direction could remove the pre-mounted unit from its final mounting position.

In this method variant, the mounting element may lock with the module casing in the final mounting position. In this way, it is ensured with little effort that the pre-mounted unit will not detach from the module casing even if a force acting against the inserting direction is applied.

In accordance with another method variant, the actuator assembly includes an electric ignition unit, wherein according to step b) an electric connector is put from outside of the module casing through a recess of the module casing and is connected to the ignition unit. In this way, an electric connection of the actuator assembly can be quickly and easily realized after mounting the latter within the airbag module. Incidentally, the pre-fabricated airbag module can be safely transported and may be easily connected to the electric vehicle system only after being mounted in a vehicle.

Incidentally, the invention also comprises an airbag module of a vehicle safety system including an airbag for restraining a vehicle occupant, a gas generator for filling the airbag with generator gas, a module casing for receiving the folded airbag and/or the gas generator, as well as an actuator assembly for activating a tether which is mounted on the module casing by means of a mounting element, especially according to the afore-described method, with the actuator assembly including a bursting portion connected to the tensile means and rupturing after actuation of the actuator assembly and forming at least one loose fragment, wherein the mounting element forms a restraining cage for the at least one loose fragment. Despite arrangement of the actuator assembly inside the module casing, it is safeguarded in a simple manner by the restraint cage formed by the mounting element that the free mobility of the fragment separated after actuation of the actuator assembly is restricted. In this way, damage of the airbag equally disposed inside the module casing by the separated fragment is largely excluded.

According to a preferred embodiment, the module casing is pot-shaped or trough-shaped and the mounting element is disposed inside the module casing.

Furthermore, the actuator assembly preferably is a pyrotechnic actuator assembly including an electric ignition unit.

Finally, the module casing may include a recess for an electric connector, with the electric ignition unit abutting on the recess. In this way, electric connection of the actuator assembly by a plug connector is easily possible.

BRIEF DESCRIPTION OF THE DRAWINGS

Further features and advantages of the invention will be evident from the following description of a preferred embodiment with reference to the drawings, wherein.

DESCRIPTION

FIGS. 1 to 8 illustrate mounting of an actuator assembly 10 for activating a tensile means 12 on a module casing 14 of an airbag module 16 for vehicle safety systems.

Figure 3:
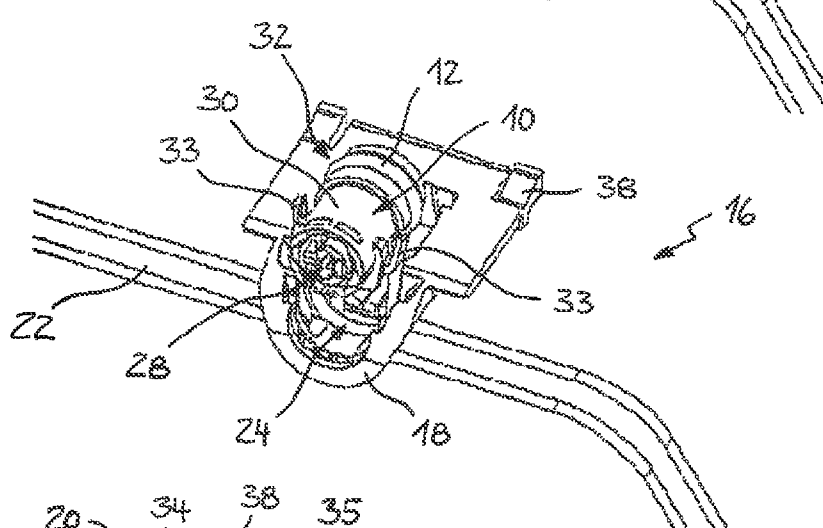
FIG. 3 shows a detailed view of the airbag module according to FIG. 2, wherein additionally an actuator assembly connected to the tensile means is provided.
Figure 4:
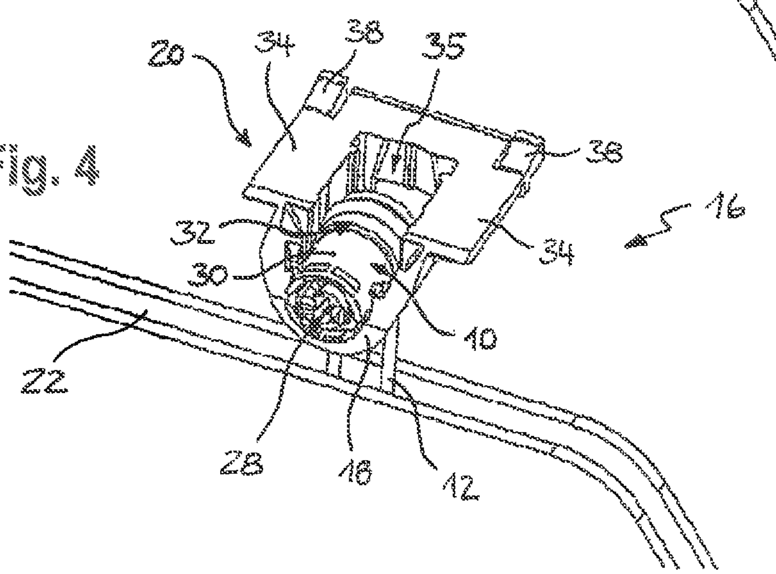
FIG. 4 shows a detailed view of the airbag module according to FIG. 3, wherein the tensile means, the actuator assembly and the mounting element form a pre-mounted unit.
Figure 5:
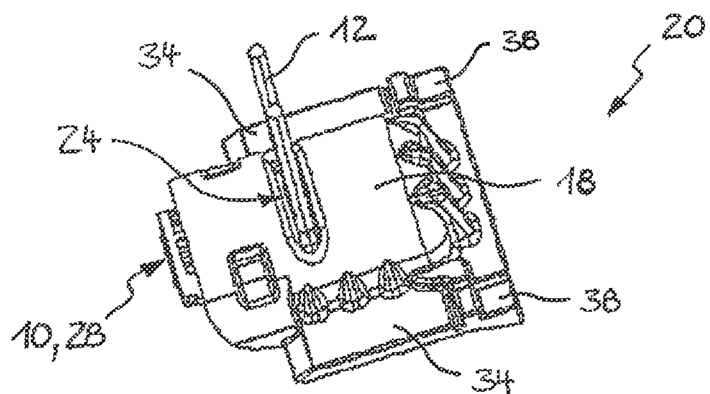
FIG. 5 shows a detailed view of the pre-mounted unit according to FIG. 4.

In the illustrated mounting method, according to FIGS. 1 to 4 the tensile means 12 is initially connected to the actuator assembly 10 and is fixed to a mounting element 18 together with the actuator assembly 10 so that the tensile means 12, the actuator assembly 10 and the mounting element 18 constitute a pre-mounted unit 20 according to FIG. 5.

Figure 6:
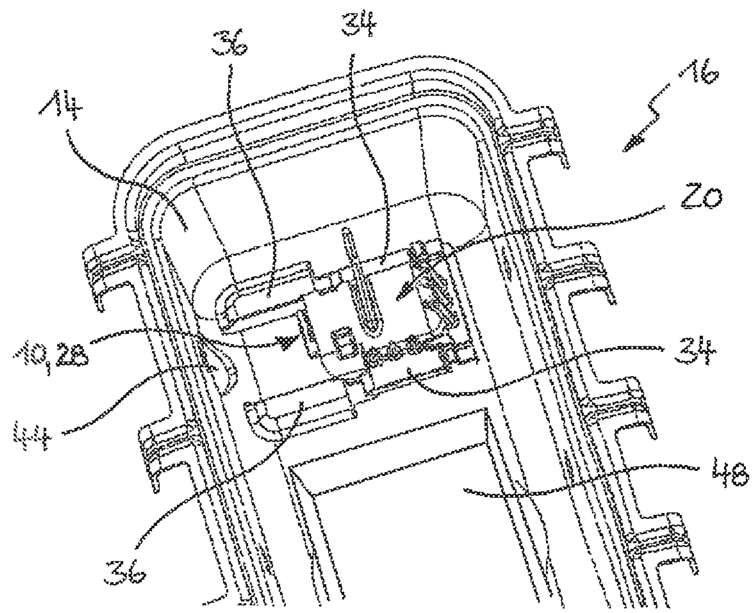
FIG. 6 shows a detailed view of an airbag module according to the invention at the beginning of mounting of the pre-mounted unit according to FIG. 5 to a module casing.
Figure 7:
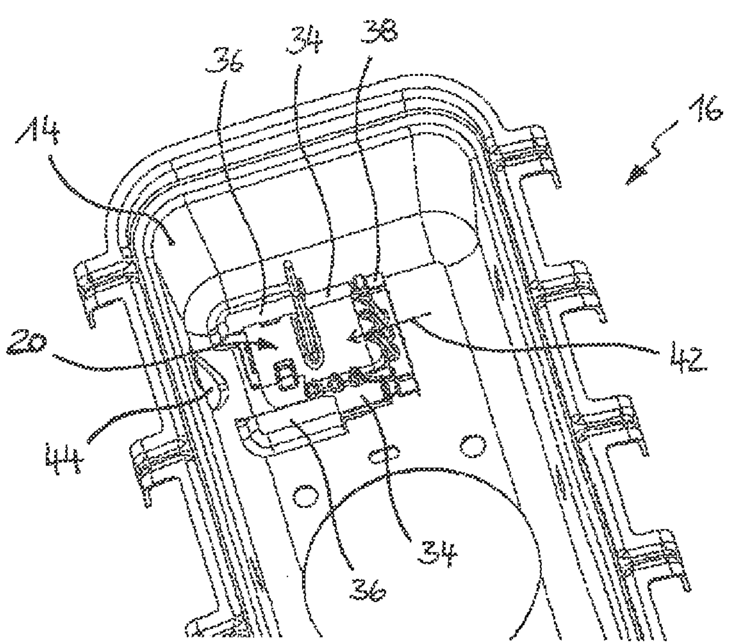
FIG. 7 shows a detailed view of the airbag module according to FIG. 6 during mounting of the pre-mounted unit according to FIG. 5.
Figure 8:
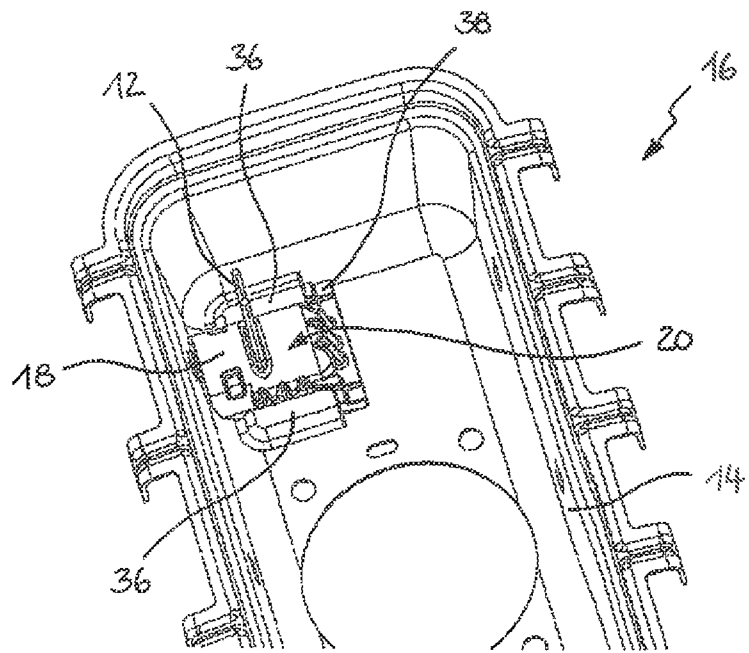
FIG. 8 shows a detailed view of the airbag module according to FIG. 6 after mounting of the pre-mounted unit according to FIG. 5.

In a subsequent method step, the pre-mounted unit 20 according to FIGS. 6 to 8 is arranged inside the module casing 14 and is fastened to the module casing 14 by means of the mounting element 18.

In addition to said general mounting process, hereinafter advantageous details of the shown method variant shall be discussed.

Figure 1:
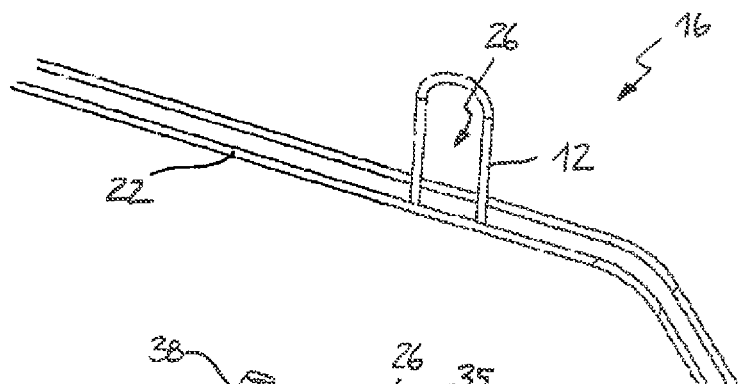
FIG. 1 shows a detailed view of an airbag module according to the invention in the area of a tensile means pre-mounted on an airbag.

The tensile means 12 according to FIG. 1 is fastened on a schematically indicated airbag 22 of the airbag module 16 already at the beginning of the mounting method. The tensile means 12 is especially in the form of a tether, string or cord and in this way can be connected, especially stitched or glued to an airbag wall already during manufacture of the airbag 22.

Figure 2:
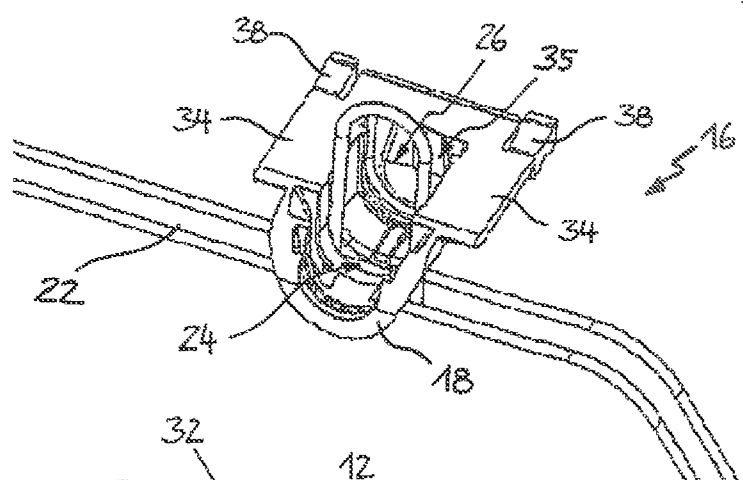
FIG. 2 shows a detailed view of the airbag module according to FIG. 1, wherein additionally a mounting element is provided.

As is evident from FIG. 2, the tensile means 12 is initially put through an opening 24 in the mounting element 18 and is subsequently connected to the actuator assembly 10. In the present example embodiment, opposite ends of the tensile means 12 are fastened to the airbag 22 so that the tensile means 12 forms a loop 26 into which the actuator assembly 10 is inserted according to FIG. 3 so as to connect the tensile means 12 to the actuator assembly 10.

The actuator assembly 10 is especially a pyrotechnic actuator assembly including an electric ignition unit 28 and an assembly casing 30 which is preferably made from synthetic material. The assembly casing 30 receives the electric ignition unit 28 and in its interior defines a combustion chamber filled with pyrotechnic material. The actuator assembly 10, concretely speaking the assembly casing 30 thereof, in the area of the combustion chamber includes a bursting portion 32 which is connected to the tensile means 12 and after actuation of the actuator assembly 10 will rupture and form at least one loose fragment.

The mounting element 18 forms (together with the module casing 14, especially a bottom of the module casing 14) a restraint cage 35 for the at least one loose fragment so as to prevent the adjacent airbag 22 from being damaged by the separated fragment.

According to FIG. 3, the bursting portion 32 of the actuator assembly 10 includes a groove-shaped predetermined breaking point in which the tensile means 12 engages. Upon actuation of the actuator assembly 10, the pyrotechnic material present in the combustion chamber is ignited by the electric ignition unit 28 and generates such high internal pressure that the actuator assembly 10, concretely speaking the assembly casing 30 thereof, ruptures at the groove-shaped predetermined breaking point so that the tensile means 12 stored there will be released.

After connection of the tensile means 12 according to FIG. 3 to the actuator assembly 10, the actuator assembly 10 according to FIG. 4 is locked with the mounting element 18 so as to form the pre-mounted unit 20. For this purpose, at the assembly casing 30 of the actuator assembly 10 flexible locking elements 33 are provided which are adapted to lock with a corresponding locking portion of the mounting element 18.

In this way, the actuator assembly 10 can be quickly and easily clipped into the mounting element 18, thus causing the tensile means 12 to be fixed to the actuator assembly 10 and the actuator assembly 10 to be fixed to the mounting element 18 in a reliable and captive manner at a desired mounting position.

The pre-mounted unit 20 shown in FIG. 5 in turn can be quickly and easily mounted on the module casing 14, with the pre-mounted unit 20 being locked especially with the module casing 14 according to the present method variant.

In accordance with FIG. 5, the mounting element 18 has opposite mounting flanges 34 for fastening the pre-mounted unit 20 in the module casing 14. Moreover, the module casing 14 according to FIG. 6 comprises guide elements 36 for the mounting flanges 34, wherein, according to FIG. 7, the mounting flanges 34 are inserted into the guide elements 36 until the pre-mounted unit 20 reaches a final mounting position according to FIG. 8. Said final mounting position is defined, for example, by a stop formed at the guide elements 36 or at the module casing 14.

In the shown variant of the mounting method, the mounting element 18 locks with the module casing 14 in its final mounting position according to FIG. 8. To this end, elastic locking elements 38 that are capable of interacting with a corresponding locking portion 40 of the module casing 14 (cf. FIG. 9) are formed at the mounting element 18.

By inserting the mounting flanges 34 into the guide elements 36 the pre-mounted unit 20 and the module casing 14 are connected permanently and reliably with little effort. The locking in the final mounting position prevents the pre-mounted unit 20 from detaching from the module casing 14 by an undesired displacement against an inserting direction 42 shown in FIG. 7. Thus, such quick and easy mounting ensures reliable fixing of the pre-mounted unit 20 in its final mounting position even in the event of high loads occurring e.g. upon actuation of the actuator assembly.

Figure 9:
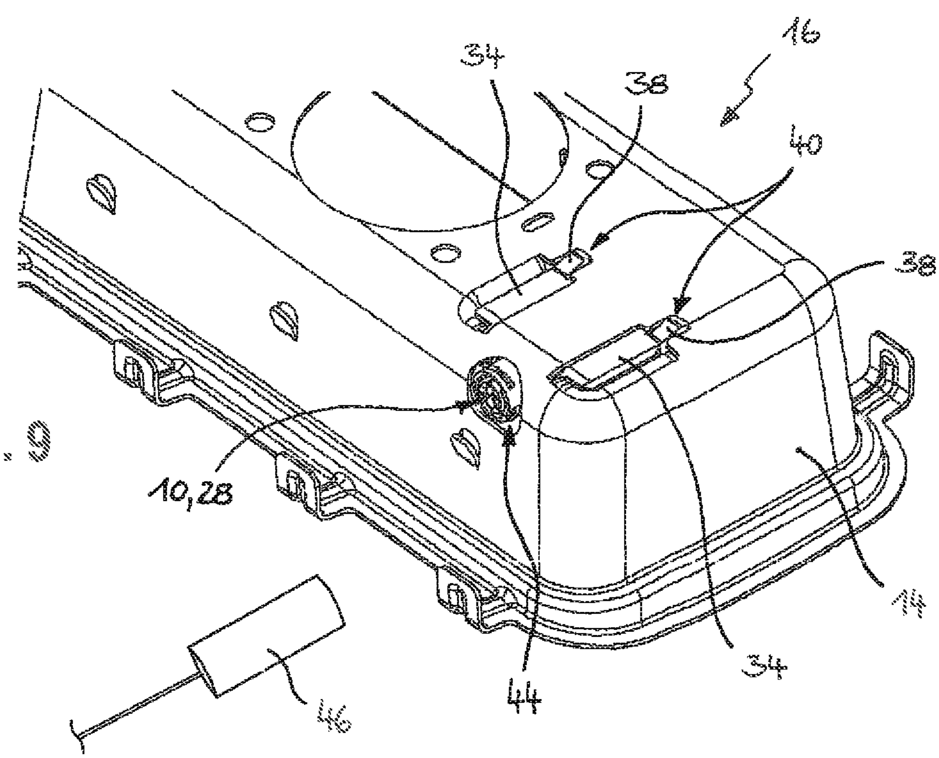
FIG. 9 shows another detailed view of the airbag module according to FIG. 8.

FIG. 9 illustrates a perspective external view of the airbag module 16 according to FIG. 8 in the area of the mounted actuator assembly 10. It becomes clear that the module casing 14 includes a recess 44 for a schematically indicated electric connector 46, with the electric ignition unit 28 of the actuator assembly 10 abutting on the recess 44.

After mounting the actuator assembly 10 within the module casing 14, the airbag module 16 can be finished and safely transported as a supplier part. Only at a later stage, for example when the airbag module 16 is installed in a vehicle, may the electric connector 46 be put through the recess 44 from outside of the module casing 14 and may be connected to the electric ignition unit 28. Hence an electric connection of the actuator assembly 10 can be straightforwardly realized by a simple plug connection.

By said mounting of the actuator assembly 10 on the module casing 14 the airbag module 16 of a vehicle safety system is formed, comprising the airbag 22 for restraining a vehicle occupant, a gas generator 48 for filling the airbag 22 with generator gas as indicated by broken lines in FIG. 6, the module casing 14 for receiving the folded airbag 22 and/or the gas generator 48 as well as the actuator assembly 10 for activating the tensile means 12 which has been mounted on the module casing 14 by means of the mounting element 18 according to the afore-described method. The actuator assembly 10 includes the bursting portion 32 which is connected to the tensile means 12 and after actuation of the actuator assembly 10 ruptures and forms at least one loose fragment, with the mounting element 18 forming the restraint cage 35 for the at least one loose fragment.

The invention claimed is:

1. A method of mounting an actuator assembly (10) including an electric ignition unit (28) for activating a tensile means (12) on a module casing (14) of an airbag module (16), comprising the following steps:

the tensile means (12) is connected to the actuator assembly (10) and is fixed to a mounting element (18) together with the actuator assembly (10) so that the tensile means (12), the actuator assembly (10) and the mounting element (18) constitute a pre-mounted unit (20);

the pre-mounted unit (20) is arranged inside the module casing (14) and is fastened to the module casing (14) by means of the mounting element (18), and following step b) an electric connector (46) is put from outside of the module casing (14) through a recess (44) of the module casing (14) and is connected to the electric ignition unit (28)

wherein in step a) the tensile means (12) is initially guided through an opening in the mounting element (18) and is subsequently connected to the actuator assembly (10).

2. The method according to claim 1, wherein prior to step a) the tensile means (12) is fastened to an airbag (22) of the airbag module (16).

3. The method according to claim 1, wherein the tensile means (12) forms a loop (26) into which the actuator assembly (10) is inserted in step a) so as to connect the tensile means (12) to the actuator assembly (10).

4. The method according to claim 1, wherein in step a) the actuator assembly (10) is locked with the mounting element (18) so as to form the pre-mounted unit (20).

5. The method according to claim 1, wherein in step b) the pre-mounted unit (20) is locked with the module casing (14).

6. The method according to claim 1, wherein the mounting element (18) includes a mounting flange (34) and the module casing (14) includes guide elements (36) for the mounting flange (34), wherein in step b) the mounting flange (34) is inserted into the guide elements (36) until the pre-mounted unit (20) reaches a final mounting position.

7. The method according to claim 6, wherein in the final mounting position the mounting element (18) locks with the module casing (14).

8. An airbag module of a vehicle safety system, comprising:

an airbag (22) for restraining a vehicle occupant, a gas generator (48) for filling the airbag (22) with generator gas, a module casing (14) for receiving the folded airbag (22) and/or the gas generator (48), as well as an actuator assembly (10) for activating a tensile means (12) which is mounted on the module casing (14) by means of a mounting element (18), according to a method as set forth in claim 1, wherein the actuator assembly (10) includes a bursting portion (32) which is connected to the tensile means (12) and after actuation of the actuator assembly (10) will rupture and form at least one loose fragment, and wherein the mounting element (18) forms a restraint cage (35) for the at least one loose fragment.

9. The airbag module according to claim 8, wherein the module casing (14) is pot-shaped or trough-shaped and the mounting element (18) is arranged inside the module casing (14).

10. The airbag module according to claim 8, wherein the actuator assembly (10) is a pyrotechnic actuator assembly including an electric ignition unit (28).

11. The airbag module according to claim 10, wherein the module casing (14) includes a recess (44) for an electric connector (46), with the electric ignition unit (28) abutting on the recess (44).

* * * * *